Patented Nov. 18, 1930

1,782,295

UNITED STATES PATENT OFFICE

VICTOR MORITZ GOLDSCHMIDT, OF OSLO, NORWAY

MANUFACTURE OF CERAMIC PRODUCTS

No Drawing. Application filed December 11, 1928, Serial No. 325,377, and in Germany August 18, 1927.

Specification No. 142,519, of October 18th, 1926, relates to a process which consists in heating a mixture of talc and manganese oxide in quantity proportions adapted to form magnesium ortho-silicate, for the purpose of converting it into fireproof material, at temperatures below the fusion point of magnesium ortho-silicate, until the raw materials are converted into magnesium ortho-silicate practically completely or in considerable quantities.

Further researches have shown that this process is not limited to the use of talc and magnesium oxide. On the contrary, as has been shown by further researches, other hydrated magnesium silicates can be converted, in the presence of magnesium-containing compounds or substances, into a valuable magnesium ortho-silicate with technically sufficient speed, at temperatures, which, if desired, may be considerably below the fusion point of magnesium ortho-silicate.

As suitable raw materials one may use magnesium hydro-silicates such for instance as serpentine, enstatite, hornblende, asbestos and other materials or substances rich in magnesium, for example asbestos waste, more particularly waste of the asbestos industry, rich in serpentine.

The invention is of particular importance for instance as regards the mineral serpentine $H_4Mg_3Si_2O_9$ which occurs in large quantities as rock, as gangue of ore dumps, sometimes in mixture with other hydrated or anhydrous magnesium silicates such as talc, enstatite, hornblende, chlorite and the like, chrysotile, picrolite, antigorite, sepiolite, saponite, serpentine-asbestos, and is produced in considerable quantities in the form of waste from dressing certain ores.

It has been found that in the presence of magnesium-containing substances, serpentine can react, at temperatures which are far below the melting range required for the formation of magnesium ortho-silicate, with a speed which is sufficient for technical purposes, with formation of magnesium ortho-silicate if the hydrated magnesium silicate or the substances containing it, are heated in a finely divided state with magnesium-containing materials to suitable temperatures. The heating could be effected for instance in suitable furnaces, if desired with movement of the material, or in such a manner that the mixture, if desired can with the co-operation of auxiliary substances such as binding agents or the like, be moulded with or without pressure, and the moulded objects are then exposed to a process of calcining.

Substances rich in magnesium, such as for instance magnesium oxide, magnesium carbonate, and the like are preferably chosen as magnesium-containing additions. Cheap natural products such as for instance raw or burned magnesite, or mixtures of raw and burned magnesite, can be employed with advantage. The magnesite could be treated in such case in the state of the relatively impure, hitherto practically valueless waste magnesite. Also other substances, more particularly such as are capable of forming magnesium oxide, could be used. Thus for instance magnesium chloride or magnesium oxy-chloride could be used alone or with others, in which cases the work must be carried out under conditions which make the conversion into magnesium oxide possible, that is to say by carrying out the process of burning with the supply of sufficient quantities of air, steam or other oxygen-containing gases or vapours.

The hydrated magnesium silicate can be treated as it occurs in nature or as obtained by ore dressing or other processes from natural materials. According to one method of carrying out the invention, the proceeding is such that the hydrated silicate, for instance serpentine, is first submitted to a process of dehydration, preferably at the lowest possible temperatures, for instance those which do not exceed 1000° C., preferably are kept below 1000° C. and preferably even below 800° C., whereupon the particular reactive material thus obtained is mixed with additions rich in magnesium and converted by renewed heating into the desired products rich in magnesium ortho-silicate. This method of working has the advantage that the shrinking of volume during the reaction is smaller. When treating moulded articles, the advantage is obtained that they have less tendency to deformation than those obtained from non-dehydrated raw material.

The process could be assisted by adding to the raw materials or to the mixed material prepared from them, reaction-accelerating agents. As such could be used chlorides, nitrates, borates, phosphates, silicates of alkaline metals, and of bivalent or trivalent metals. The reaction accelerators, for instance common salt, water glass, magnesium nitrate, aluminum phosphate, are preferably added to the reaction mass in small quantities, for instance of the order 0.1%–5%.

In certain cases the same advantages could be obtained also by the treatment of raw materials which already contain such reaction accelerators. The presence of such reaction accelerators or of substances which can form such, makes it possible to carry out the process at lower temperatures or with a shorter heating period.

As suitable raw materials, in addition to pure or relatively pure serpentine, could also be used serpentine-containing substances, such as mixtures of serpentine with other magnesium- hydro-silicates or with anhydrous and hydrated silicates, or mixtures of serpentine, asbestos and the like with substances rich in magnesium, magnesite, dolomite and the like. The substances are treated preferably in a finely divided state.

*Example*.—100 parts serpentine (of the composition: 41 per cent by weight $SiO_2$, 42 per cent by weight of MgO, 4 per cent by weight of iron oxides and 13 per cent by weight of water) of a grain size of less than 0.05 mm., are thoroughly mixed with 90 parts of impure magnesite brought to approximately the same size of grain (for instance of the composition: 40 per cent by weight of MgO, 40 per cent by weight of carbonic acid, 14 per cent by weight of $SiO_2$ and 4 per cent by weight of iron oxides). By heating the mixed material for a period of two hours to two days (according to the physical nature of the raw materials) to temperatures of 1300°, a material will be obtained which is constituted largely of magnesium ortho-silicate, and is distinguished by great refractoriness and strength even when acted upon by very high temperatures.

The proportions of the raw materials should be preferably calculated so that the quantity of silicic acid shall not exceed, or not substantially exceed, the quantity required for the formation of magnesium ortho-silicate, whilst the quantity of the magnesium compounds could be calculated if desired so that the finished product shall contain free magnesium oxide in greater or less quantities.

With the raw materials, or with the products prepared from the same, could be further incorporated also auxiliary substances such as aluminum compounds which could be used for instance in the form of clay or kaolin or iron-oxygen compounds which could be used for instance in the form of magnetite, especially the latter if desired in considerable quantities. By incorporating aluminium compounds, the resistance or strength of the products can be increased. By incorporating iron-oxygen compounds, the products can be improved, for instance as regards their conductivity to heat and electricity. If desired, several such products could be incorporated. It goes without saying that such auxiliary substances could be introduced into the mixtures to be prepared or into the products to be made from them, also by a suitable choice of raw materials containing them.

With the mixtures or masses could be further incorporated also filling substances, diluting agents or the like. As filling substances could be used chiefly natural or artificial magnesium ortho-silicate, more particularly ground olivine rock, olivine sand and the like.

The products manufactured according to the invention could be used as rammed mass, cast mass, spraying mass, painting mass, mortar and the like. They could be further converted into moulded bodies, such as stones, bricks and the like. The shaping could be effected with co-operation of binding agents or with the assistance of pressure or by the joint use of both measures. As binding agents could be preferably used substances which are capable of producing a hardening of the moulded body before the process of burning and which during the burning process are partly or even completely burnt. Sulphite cellulose waste lyes or products, such as extracts, obtained from them have been found suitable.

When using pressure, it is preferable to apply pressures of more than 300 kg. per square centimeter, for instance 500–1000 kg. or even higher. The burning can be carried out in one or more stages, if desired with the use of different temperatures, and it can be effected entirely or partly only at the place of use. For instance in the factory moulded bodies suitable for transport could be produced, for instance with joint utilization of pressure or by preliminary heating or by utilization of both, the burning being completed at the place of use.

The use of magnesium hydro-silicates such as serpentine, offers various advantages over the use of talc. For instance the process of burning can be carried out at lower temperatures and the time of heating reduced. A special advantage of the use of serpentine and the like is that considerably less magnesium oxide, magnesite and the like substances will be required. It is possible to do, for instance with magnesium oxide, quantities which amount to less than one half of the quantities required for the treatment of talc.

Claims:

1. A process for the manufacture of ceramic products, in which mixtures of magnesium hydro-silicates, with the exception of talc, with substances rich in magnesium are used, then heating the mixtures to temperatures at which magnesium ortho-silicate is formed without fusion.

2. A process for the manufacture of ceramic products, in which serpentine is heated with substances rich in magnesium, to temperatures at which magnesium ortho-silicate is formed, without fusion.

3. A process for the manufacture of ceramic products, in which serpentine is heated with magnesium oxide to temperatures at which magnesium ortho-silicate is formed, without fusion.

4. A process for the manufacture of ceramic products, in which serpentine is heated with burnt magnesite to temperatures at which magnesium ortho-silicate is formed without fusion.

5. A process for the manufacture of ceramic products, in which mixtures of magnesium hydro-silicates, with the exception of talc, are heated with substances rich in magnesium, said latter substances being in quantities in exesss of those required for the formation of magnesium ortho-silicate, to temperatures at which magnesium ortho-silicate is formed without fusion.

6. A process for the manufacture of ceramic products, in which serpentine is heated with quantities of substances rich in magnesium so that the product obtained also contains large quantities of free magnesium oxide in addition to the magnesium ortho-silicate formed.

7. A process for the manufacture of ceramic products, in which magnesium hydro-silicates with the exception of talc, are submitted to a preliminary dehydration and then heated in admixture with substances rich in magnesium, to temperatures at which magnesium ortho-silicate is formed, without fusion.

8. A process for the manufacture of ceramic products, in which magnesium hydro-silicates with the exception of talc, are mixed with substances rich in magnesium, then molding the mixed material under high pressure and then heating the molded bodies to temperatures, at which magnesium ortho-silicate is formed without fusion.

9. A process for the manufacture of ceramic products, in which a mixture of magnesium hydro-silicates, excepting talc, and substances rich in magnesium is moulded with binding agents which harden before heating, then heating the moulded bodies to temperatures at which magnesium ortho-silicate is formed, without fusion.

10. A process for the manufacture of ceramic products, in which mixtures of magnesium hydro-silicates with the exception of talc, with substances rich in magnesium are moulded at high pressures with the aid of binding agents, and thereafter heating the moulded bodies to temperatures at which magnesium ortho-silicate is formed without fusion.

11. A process for the manufacture of ceramic products, in which mixtures of magnesium hydro-silicates, excepting talc, with substances rich in magnesium are formed, then adding magnesium ortho-silicate and then heating the resulting mixture to temperatures at which magnesium ortho-silicate is formed without fusion.

12. A process for the manufacture of ceramic products, in which mixtures of serpentine, caustically burnt magnesite and natural olivine are heated to temperatures at which magnesium ortho-silicate is formed without fusion.

In testimony whereof I affix my signature.

VICTOR MORITZ GOLDSCHMIDT.